US008229935B2

(12) United States Patent
Lee et al.

(10) Patent No.: US 8,229,935 B2
(45) Date of Patent: Jul. 24, 2012

(54) PHOTO RECOMMENDATION METHOD USING MOOD OF MUSIC AND SYSTEM THEREOF

(75) Inventors: Jae Won Lee, Seoul (KR); Hyoung Gook Kim, Yongin-si (KR); Jung Eun Kim, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 679 days.

(21) Appl. No.: 11/826,006

(22) Filed: Jul. 11, 2007

(65) Prior Publication Data

US 2008/0110322 A1 May 15, 2008

(30) Foreign Application Priority Data

Nov. 13, 2006 (KR) ........................ 10 2006 0111769

(51) Int. Cl.
*G06F 7/00* (2006.01)

(52) U.S. Cl. ........................................................ 707/754

(58) Field of Classification Search .................. 707/754, 707/999.007
See application file for complete search history.

(56) References Cited

U.S. PATENT DOCUMENTS 5,107,343 A * 4/1992 Kawai ........................... 386/106
6,245,984 B1 * 6/2001 Aoki et al. ...................... 84/611
6,938,209 B2 * 8/2005 Ogawa et al. ................. 715/727
7,368,652 B2 * 5/2008 Iketani et al. .................... 84/609
2003/0154446 A1 * 8/2003 Constant et al. .............. 715/531
2005/0054441 A1 * 3/2005 Landrum et al. ................ 463/35
2005/0120868 A1 * 6/2005 Hinman et al. ................. 84/615
2005/0123886 A1 * 6/2005 Hua et al. .................. 434/307 A
2006/0065105 A1 * 3/2006 Iketani et al. ................... 84/609
2006/0170945 A1 * 8/2006 Bill .............................. 358/1.13
2007/0064121 A1 * 3/2007 Issa et al. ................... 348/231.2
2008/0065469 A1 * 3/2008 Specter et al. .................. 705/10

FOREIGN PATENT DOCUMENTS

JP 2005-181646 7/2005
JP 2006-244002 9/2006
KR 1995-0004220 2/1995
KR 10-2006-0057050 5/2006
KR 10-0615522 8/2006
KR 10-0725357 5/2007
KR 10-0785928 12/2007

OTHER PUBLICATIONS

Office Action dated Jan. 25, 2008 in corresponding Korean Patent Application No. 10-2006-0111769 (5 pages).
X. Hua et al., "Content Based Photograph Slide Show with Incidental Music," Microsoft Research Asia, 2003.

* cited by examiner

*Primary Examiner* — Kimberly Wilson
*Assistant Examiner* — Mohammed R Uddin
(74) *Attorney, Agent, or Firm* — Staas & Halsey LLP

(57) ABSTRACT

A photo recommendation method using a mood of music is provided. The photo recommendation method using the mood of the music includes: categorizing the music into a mood by analyzing a sound source of the music; searching for a photo using meta information of the music; and recommending the photo corresponding to the categorized mood of the music according to a result of the searching.

13 Claims, 10 Drawing Sheets
(1 of 10 Drawing Sheet(s) Filed in Color)

100

| MOOD OF MUSIC | MAIN COLOR | CATEGORY |
|---|---|---|
| EXCITING | RED | ALL |
| PLEASANT | YELLOW | ALL |
| CALM | BLUE | TERRAIN, ARCHI., MACRO |
| SAD | GREEN | TERRAIN, ARCHI., MACRO |

PHOTO RECOMMENDATION METHOD USING MOOD OF MUSIC AND SYSTEM THEREOF

CROSS-REFERENCE TO RELATED APPLICATION

This application claims the benefit of Korean Patent Application No. 10-2006-0111769, filed on Nov. 13, 2006, in the Korean Intellectual Property Office, the disclosure of which is incorporated herein by reference.

BACKGROUND OF THE INVENTION

1. Field of the Invention

The present invention relates to a photo recommendation method using a mood of music and a system thereof. More particularly, the present invention relates to a photo recommendation method and a system using the method, which recommend a photo using information of a mood of music, a photo color, and photo categorization after searching for an associated photo using a music title and lyrics.

2. Description of Related Art

Currently, a sound source player such as an MP3 player generally tends to provide visual information, such as lyrics, with a service of playing a sound source of the MP3.

In case of a digital camera, the digital camera provides a function of taking a picture of an object, and also provides a function displaying the taken photo in a various forms.

Also, multimedia devices having multiple functions, such as the MP3 player function and a digital camera function, are gradually being popularized.

Currently, a method which can simultaneously use the various function of the multimedia devices are required, i.e. a user simultaneously uses a function of the digital camera while listening to the sound source, played via the multimedia device.

However, current techniques of using the various functions of the multimedia devices are at unsatisfactory levels since currently the user may only visualize an equalizer in form of a moving picture while listening to the sound source of the music.

A photo-music association recommendation method using the multi media devices according to a related art has a search function which searches for image data having a high association with music data, using meta data of music data, and meta data of photo data. As an example, when a genre of the music data is a dance music, and when lyrics of the music data relates to break-up, and if a photo associated with Christmas is provided to a user, since the music data is the dance music, matching between the photo and the music is not properly performed. As described above, the photo-music association recommendation method using the multi media devices according to the related art has a disadvantage in that, the image data having a high association with the music data may not be accurately retrieved by using the meta data.

A music recommendation method using photo information according to a related art has problems in that, music may not be variously recommended by using photo color information, and a music recommendation function, having music being recommended from a location photo, is so limited.

Also, the music recommendation method using photo information according to a related art has a problem in that, the same music may be recommended since photos having contrasting atmospheres may be categorized into a similar photo group.

Also, the music recommendation method using photo information according to a related art has a problem in that, a photo and music having opposite atmospheres may be recommended since there is less association between a photo categorized according to color information and music categorized according to beat information.

BRIEF SUMMARY

An aspect of the present invention provides a photo recommendation method and a system using the method which can recommend a photo using information of a mood of music and photo categorization after searching for an associated photo with music title and lyrics information.

An aspect of the present invention also provides a photo recommendation method and a system using the method which can automatically recommend a photo appropriate for music, from photos stored by a user.

According to an aspect of the present invention, there is provided a photo recommendation method including: categorizing the music into a mood by analyzing a sound source of the music; searching for a photo using meta information of the music; and recommending the photo corresponding to the categorized mood of the music according to a result of the searching.

According to another aspect of the present invention, there is provided a photo recommendation system including: a music mood categorizer categorizing the music into a mood; a photo search module searching for a photo using meta information of the music; and a photo recommendation module recommending the photo corresponding to the categorized mood of the music according to a result of the searching.

Additional and/or other aspects and advantages of the present invention will be set forth in part in the description which follows and, in part, will be obvious from the description, or may be learned by practice of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
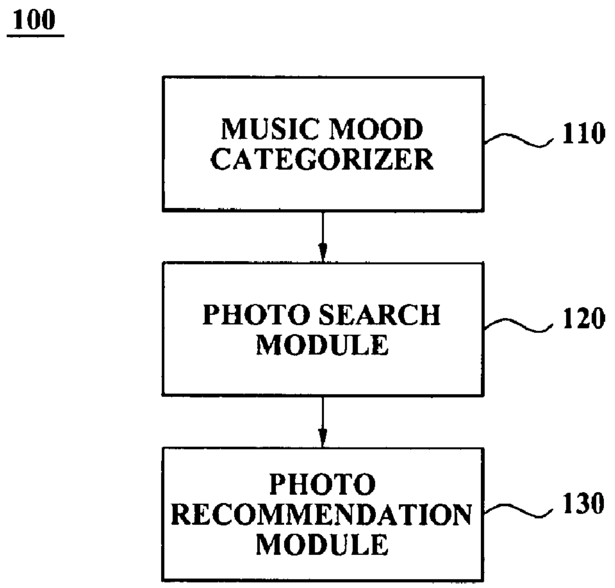
FIG. 1 is a diagram illustrating a configuration of a photo recommendation system using a mood of music according to the present invention.

Reference will now be made in detail to exemplary embodiments of the present invention, examples of which are of the accompanying drawings, wherein like reference numerals refer to the like elements throughout. The exemplary embodiments are described below in order to explain the present invention by referring to the figures.

FIG. 1 is a diagram illustrating a configuration of a photo recommendation system 100 using a mood of music according to the present invention.

Referring to FIG. 1, the photo recommendation system 100 using the mood of the music according to the present invention includes a music mood categorizer 110, a photo search module 120, and a photo recommendation module 130. The music mood categorizer 110 categorizes music into a mood. The mood of the music may be represented as 'exciting', 'pleasant', 'calm', and 'sad', and the categorization of the mood of the music is previously categorized off-line, and inputted into meta information. The music mood categorizer 110 extracts a timbre feature for a sound source of the music, and categorizes the music into the mood according to the extracted timbre feature. Namely, the music mood categorizer 110 extracts the timbre feature with respect to the sound source of the music, and categorizes the music into the mood using a categorizer which is previously trained with the extracted timbre feature. The categorizer previously learns a representing timbre feature of each of the mood, and compares the extracted timbre feature with the previously learned timbre feature, and categorizes the mood corresponding to a similar timbre feature. Hereinafter, operations of the music mood categorizer 110 will be described in detail by referring to FIG. 2.

Figure 2:
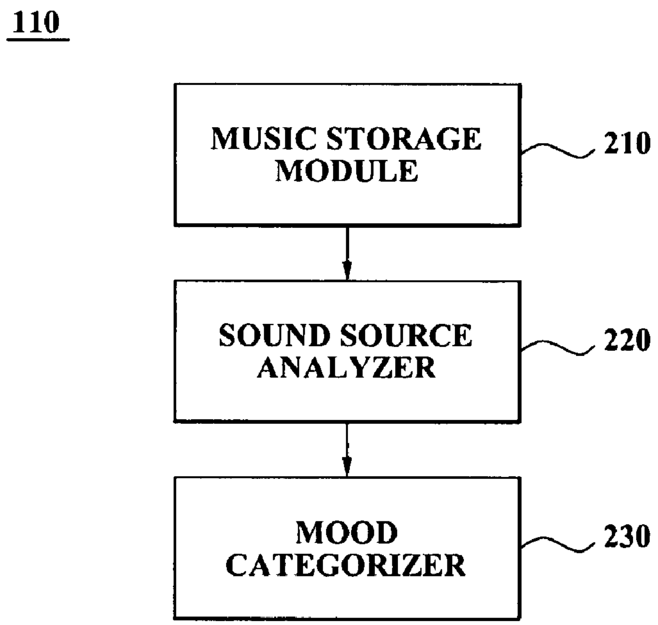
FIG. 2 is a diagram illustrating an embodiment of the music mood categorizer of FIG. 1.

FIG. 2 is a diagram illustrating an embodiment of the music mood categorizer 110 of FIG. 1.

Referring to FIG. 2, the music mood categorizer 110 of FIG. 1 includes a music storage module 210, a sound source analyzer 220, and a mood categorizer 230.

The music storage module 210 stores a sound source of music and meta information of the music. The meta information of the music may include information of a music title, lyrics, a singer, and a genre, and information of categorization of a mood of music, which is previously categorized off-line.

The sound source analyzer 220 analyzes a sound source of the music. Namely, the sound source analyzer 220 extracts a timbre feature of the music from the sound source of the music, and analyzes the extracted timbre feature.

The mood categorizer 230 categorizes the music into the mood according to a result of the analysis of the sound source. Namely, the mood categorizer 230 categorizes the music into the mood using a categorizer which is previously trained with the extracted timbre feature, based on the analyzed timbre feature.

The photo search module 120 of FIG. 1 searches for a photo using the meta information of the music. Namely, the photo search module 120 of FIG. 1 extracts a search vocabulary to search for the photo using information of music title, lyrics, singer, and genre, included in the meta information of the music, and searches for the photo using the extracted search vocabulary. Hereinafter, the photo search module 120 of FIG. 1 will be described in detail by referring to FIG. 3.

Figure 3:
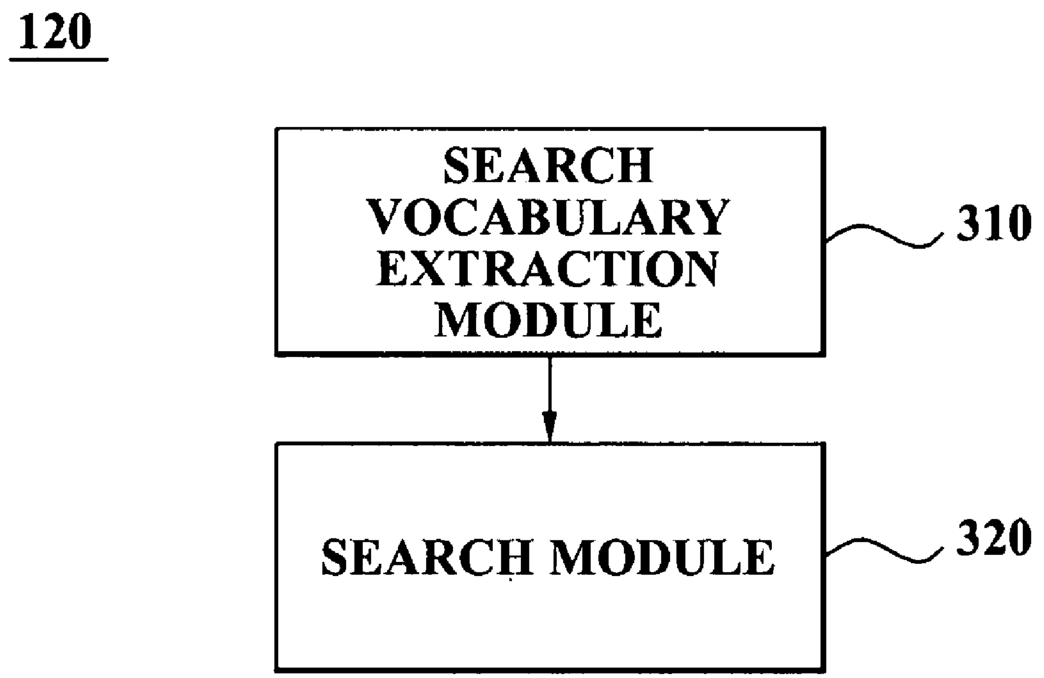
FIG. 3 is a diagram illustrating an embodiment of a photo search module of FIG. 1.

FIG. 3 is a diagram illustrating an embodiment of the photo search module 120 of FIG. 1 of FIG. 1.

Referring to FIG. 3, the photo search module 120 of FIG. 1 includes a search vocabulary extraction module 310, and search module 320.

The search vocabulary extraction module 310 extracts a search vocabulary to search for a photo using information of a music title, lyrics, a singer, and a genre, included in the meta information of the music. Hereinafter, a configuration and operation of the search vocabulary extraction module 310 will be described in detail by referring to FIG. 4.

Figure 4:
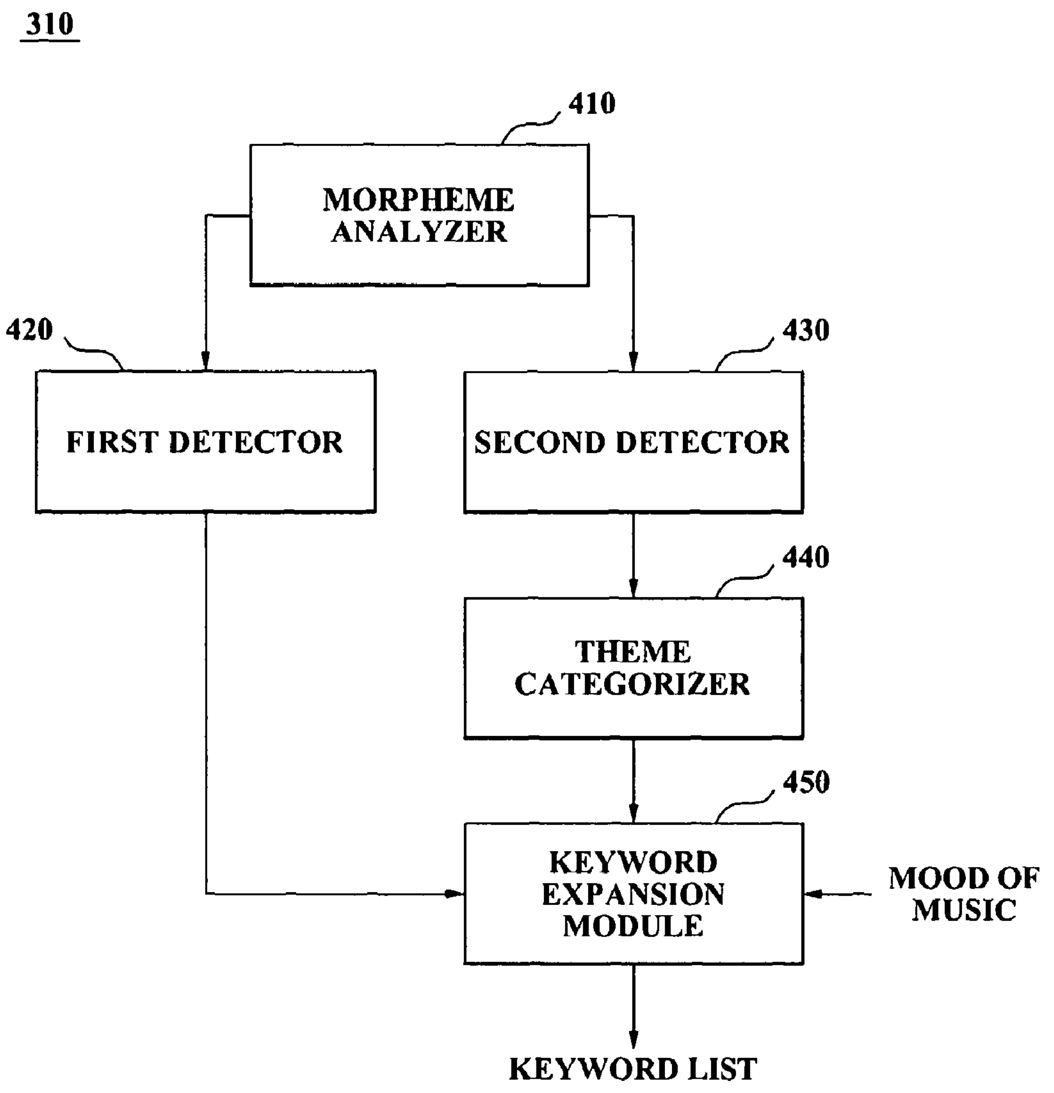
FIG. 4 is a diagram illustrating an embodiment of a search vocabulary extraction module of FIG. 3.

FIG. 4 is a diagram illustrating an embodiment of the search vocabulary extraction module 310 of FIG. 3.

Referring to FIG. 4, the search vocabulary extraction module 310 of FIG. 3 includes a morpheme analyzer 410, a first detector 420, a second detector 430, a theme categorizer 440, and a keyword expansion module 450.

The morpheme analyzer 410 analyzes a morpheme with respect to information of a music title, lyrics, a singer, and a genre, included in the meta information of the music. The morpheme analyzer 410 analyzes the morpheme, forming the music title, the lyrics, the singer, and the genre, and outputs tag information associated with a result of the analysis of the morpheme. Namely, the morpheme analyzer 410 may output the tag information associated with the result of the analysis of the morpheme with respect to the information of the music title, the lyrics, the singer, and the genre as 'Blue/PAA'+'night/NCD'+'Seoul/NQ'+'in/JCA' when the music title is 'Blue Night in Seoul'.

The first detector 420 extracts an associated keyword using the result of the analysis of the morpheme with respect to the music title. Namely, the first detector 420 extracts a keyword closely associated with searching for the photo from the result of the analysis of the morpheme with respect to the information of the music title, the lyrics, the singer, and the genre. As an example, the first detector 420 may detect the keyword associated with a 'where/location', 'what/object', 'who/people', 'when/time', 'what/event', and 'which/action' which follows a 6Ws principle, based on the result of the analysis of the morpheme with respect to the information of the music title, the lyrics, the singer, and the genre. Also, the first detector 420 detects the keyword associated with the searching for the photo using an ontology with respect to the result of the analysis of the morpheme, based on a six W's principle and a hierarchy relation.

The second detector 430 detects a feature for categorizing the music into the theme based on the result of the analysis of the morpheme. Namely, the second detector 430 detects the feature for categorizing the music into the theme using the result of the analysis of the morpheme with respect to the information of the music title, the lyrics, the singer, and the genre. The feature for categorizing the music into the theme is a feature that is necessary for categorizing music into a theme, and a feature for categorizing the lyrics of the music may be previously determined by training.

The theme categorizer 440 categorizes the music into the theme based on the detected feature for categorizing the music into the theme. Namely, the theme categorizer 440 categorizes the music into the theme using a categorizer which is previously trained based on the detected feature for categorizing the music into the theme. As an example, the theme categorizer 440 may variously categorizes the music into themes such as 'love', 'breakup', 'spring', 'summer', 'fall', and 'winter'. The theme of the music may be categorized based on the result of the analysis of the morpheme with respect to the music title, the lyrics, the singer, and the genre by the theme categorizer 440.

The keyword expansion module 450 expands a photo keyword based on an associated keyword, theme of the music, and the mood of the music. Namely, the keyword expansion module 450 expands the photo keyword using the associated keyword with respect to the keyword, the theme of the music, and the mood of the music in preparation for a case few photos are retrieved, or a case a non-photo is retrieved when the photo is retrieved using only a basic keyword.

As an example, when a basic keyword is 'love', the keyword expansion module 450 initially searches for a photo using the 'love' for the basic keyword, subsequently expands the basic keyword 'love' to an associated keyword with the basic keyword, the theme of the music, and the mood of the music, such as 'lover', 'date', 'first love', 'one-sided love', 'family', 'song', and 'propose', in preparation for in case non-photo corresponds to a result of the searching.

As another example, when a basic keyword is 'breakup', the keyword expansion module 450 initially searches for a photo using 'breakup' for the basic keyword, subsequently expands the basic keyword 'breakup' to an associated keyword with the basic keyword, the theme of the music, and the mood of the music, such as 'tears', 'broken-heart', 'rain', and 'last date', in preparation for the case the non-photo corresponds to a result of the searching.

As still another example, when a basic keyword is 'pleasant', the keyword expansion module 450 initially searches for a photo using 'pleasant' for the basic keyword, subsequently expands the basic keyword 'pleasant' to an associated keyword with the basic keyword, the theme of the music, and the mood of the music, such as 'pleased', 'joy', 'hilarious', and 'exciting', in preparation for the case the non-photo corresponds to a result of the searching.

The search module 320 searches for a photo associated with the music using the extracted search vocabulary. As an example, when an extracted search vocabulary is 'summer', the search module 320 searches for a photo associated with the extracted search vocabulary 'summer'. As another example, when an extracted search vocabulary is 'breakup', the search module 320 searches for a photo associated with the extracted search vocabulary 'breakup'.

The photo recommendation module 130 of FIG. 1 recommends a photo corresponding to the categorized mood of the music as a result of the searching.

Figures 7, 8:
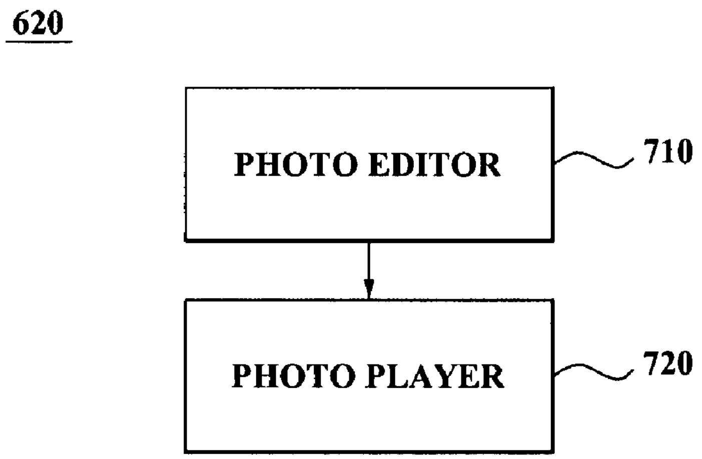
FIG. 7 is a diagram illustrating an embodiment of a configuration of a recommendation module of FIG. 6.
FIG. 8 is a diagram illustrating an embodiment of categorizing music mood, a main color, and a category, which are applied to a photo recommendation method according to the present invention.

As an example, when the mood of the music is 'exciting' as a the result of the searching, a main color corresponding to a mood 'exciting' is red as illustrated in FIG. 8, in this case, the photo recommendation module 130 of FIG. 1 may recommend photos in all categories. The photos in all categories may include all recommendable photos in all categories.

As another example, when the mood of the music is 'pleasant' according to the result of the searching, a main color corresponding to a mood 'pleasant' of the music is yellow as illustrated in FIG. 8, and the photo recommendation module 130 of FIG. 1 may recommend photos of all categories.

As still another example, when the mood of the music is 'calm' as the result of the searching, a main color corresponding to a mood 'calm' is blue as illustrated in FIG. 8, and the photo recommendation module 130 of FIG. 1 may recommend photos of 'terrain', 'architecture', and 'macro' categories.

As yet another example, when the mood of the music is 'sad' as the result of the searching, a main color corresponding to a mood 'sad' is green as illustrated in FIG. 8, and the photo recommendation module 130 of FIG. 1 may recommend photos in a 'terrain', 'architecture', and a 'macro' categories.

Figure 5:
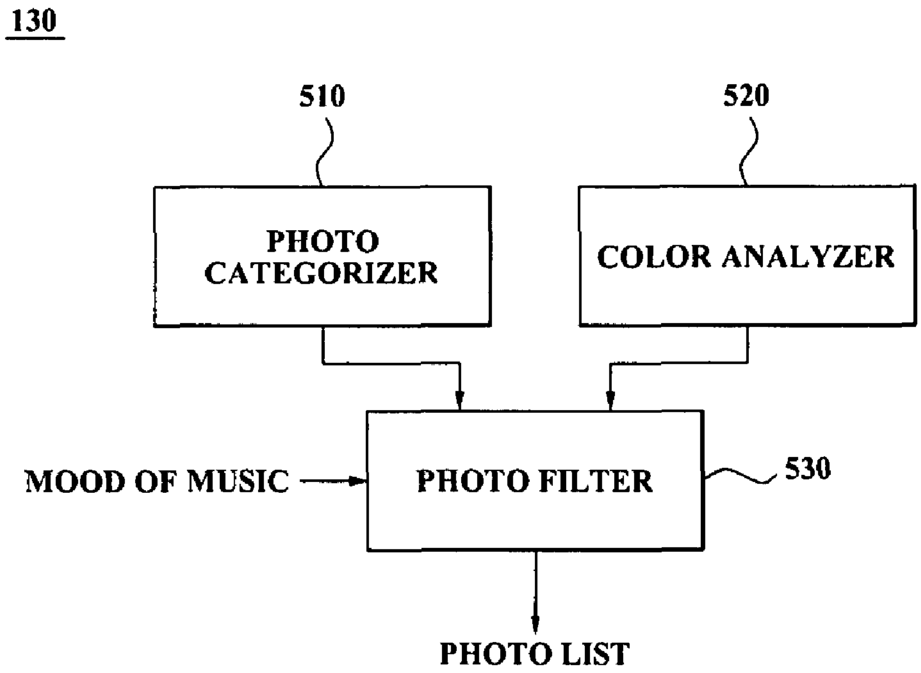
FIG. 5 is a diagram illustrating an embodiment of a configuration of a photo recommendation module of FIG. 1.

FIG. 5 is a diagram illustrating an embodiment of a configuration of the photo recommendation module 130 of FIG. 1.

Referring to FIG. 5, the photo recommendation module 130 of FIG. 1 includes a photo categorizer 510, a color analyzer 520, and a photo filter 530.

The photo categorizer 510 categorizes a photo. Namely, the photo categorizer 510 categorizes the photo using a feature of the photo and exchange image file format (Exif) information of the photo. The category of the photo may be variously categorized according to a location where the photo is taken, an object of the photo, a way of taking the photo according to a person, a topography, a building, and a macro. The categorization of the photo may be loaded in a form of meta information as a result of a photo search by a text after having been performed offline.

The color analyzer 520 analyzes a color of the photo. Namely, the color analyzer 520 extracts a color feature included in the photo, and analyzes a main color included in the photo based on a result of the extraction of the color feature. The color analyzer 520 extracts a maximum bin in a color histogram included in the retrieved photo, and analyzes the main color based on the extracted maximum bin.

The photo filter 530 filters the retrieved photo by referring to the mood of the music, the color of the photo, and the category of the photo.

As an example, when a mood of the music is 'calm' as illustrated in FIG. 8, the photo filter 530 may select a photo in a category whose main color is nearly close to blue, and may select a photo not in a category of a person, from the retrieved photo.

As another example, when a mood of the music is close to 'exciting', the photo filter 530 may select a photo whose colors are various and bright from the retrieved photo.

As still another example, when a mood of the music corresponds to 'calm', the photo filter 530 may select a photo whose colors are monotonous and gloomy from the retrieved photo.

Figure 6:
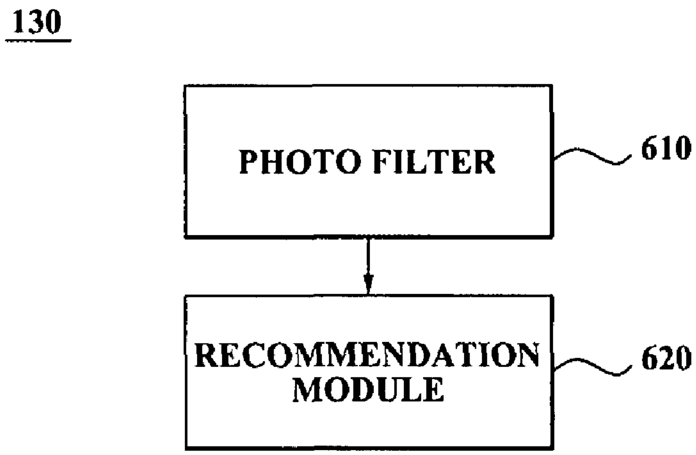
FIG. 6 is a diagram illustrating another embodiment of a configuration of the photo recommendation module of FIG. 1.

FIG. 6 is a diagram illustrating another embodiment of a configuration of the photo recommendation module 130 of FIG. 1.

Referring to FIG. 6, the photo recommendation module 130 of FIG. 1 includes a photo filter 610 and a recommendation module 620.

The photo filter 610 filters the retrieved photo based on the categorized mood of the music. The recommendation module 620 recommends an appropriate photo according to a result of the filtering of the photo.

FIG. 7 is a diagram illustrating an embodiment of a configuration of the recommendation module 620 of FIG. 6.

Referring to FIG. 7, the recommendation module 620 of FIG. 6 includes a photo editor 710 and a photo player 720. The photo editor 710 edits the recommended photo into a moving picture. Namely, the photo editor 710 edits the recommended photo by applying various image conversions effect such as cross fade, checkerboard, circle, wipe, and slide, and generates the moving picture by the editing of the recommended photo. Initially, the photo editor 710 displays photos whose keyword are matched together by being limited to cases where lyrics are provided, subsequently, with respect to the remaining part, the photo editor 710 displays photos whose color are matched. In this case, the photos whose colors are matched are displayed based on a beat boundary and a mood, and a genre of the music. As an example, when there is a plurality of photos whose colors are matched, the photo editor 710 may edit the plurality of the photos into a slide show type moving picture.

The photo player 720 plays the edited moving picture. As an example, (when the edited moving picture is the slide show type moving picture, the photo player 720 plays the moving picture slower when the genre of the music is Rhythm & Blues and a mood of the music is 'calm', and the photo player 720 plays the moving picture faster when a mood of the music is 'exciting'.

FIG. 8 is a diagram illustrating an embodiment a mood of music, a main color, and a category, applied to a photo recommendation method according to the present invention.

Referring to FIG. 8, the photo recommendation method according to the present invention recommends a photo, corresponding to the mood of the music, by considering the mood of the music, a main color of a photo, and a category of the photo.

The mood of the music may be categorized according to a timber feature after the timber feature is extracted with respect to a sound source of the music by the music mood categorizer 110 of FIG. 1, and may represented as 'exciting', 'pleasant', 'calm', and 'sad'.

The main color is a most frequently used color by the color analyzer 520 of FIG. 5 from colors included in the photo, and may be a representing color of the photo. As an example, the main color may be red when the sun is selected for taking a photo, the main color may be yellow when the banana is selected for taking a photo, the main color may be blue when the sea is selected for taking a picture, and the main color may be green when a forest is selected for taking a photo.

The category of photo may be categorized depending on an object or a method of taking the photo, such as a terrain, an architecture, and a macro.

As described above, the photo recommendation system 100 of FIG. 1 using a mood of music according to the present invention may more accurately recommend a photo associated with music using mood information of the music, color information of the photo, and categorization information of the photo after searching for an associated photo using the music title, and the lyrics.

Also, the photo recommendation system 100 of FIG. 1 using a mood of music according to the present invention may more variously use a function of a multimedia device by automatically recommending an appropriate photo for the music from photos that are taken using the multimedia device.

Also, the photo recommendation system 100 of FIG. 1 using a mood of music according to the present invention may improve utility of stored photos having been taken, by automatically recommending an appropriate photo for the music from the stored photos having been taken using the multimedia device.

Figure 9:
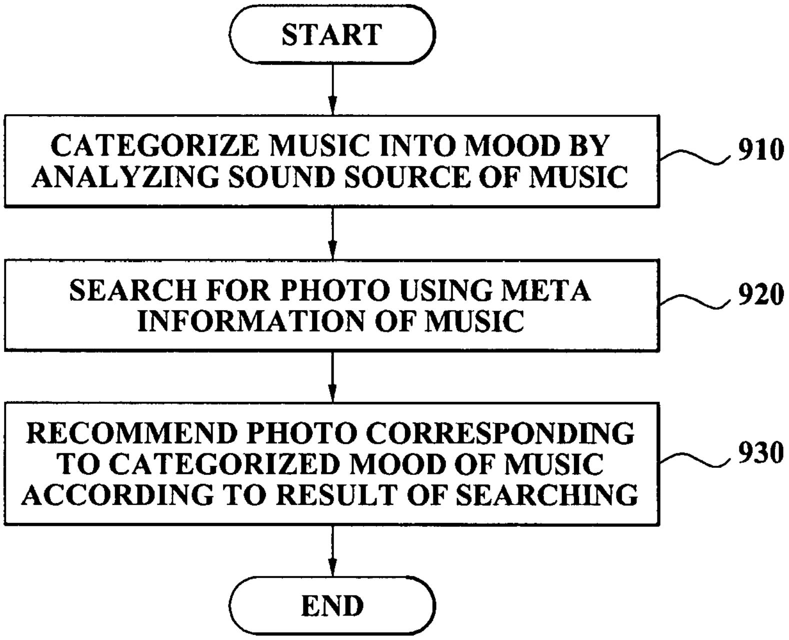
FIG. 9 is a flowchart illustrating the photo recommendation method using the categorizing music mood according to another embodiment of the present invention.

FIG. 9 is a flowchart illustrating a photo recommendation method using mood of music according to another embodiment of the present invention.

Referring to FIG. 9, the photo recommendation system 100 of FIG. 1 using the mood of the music categorizes the music into the mood in operation 910. The mood of the music may be represented as 'exciting', 'pleasant', 'calm', and 'sad', and the categorization of the mood of the music is previously categorized off-line, and inputted into meta information. The photo recommendation system 100 extracts a timbre feature for a sound source of the music, and categorizes the music into mood according to the extracted timbre feature. Namely, in operation 910, the photo recommendation system 100 extracts the timbre feature with respect to the sound source of the music, and categorizes the music into the mood using a categorizer which is previously trained with the extracted timbre feature. The categorizer previously learns a representing timbre feature of each of the mood, and compares the extracted timbre feature with the previously learned timbre feature, and categorizes the mood corresponding to a similar timbre feature. Hereinafter, the categorization of the mood of the music will be described in detail by referring to FIG. 10.

Figure 10:
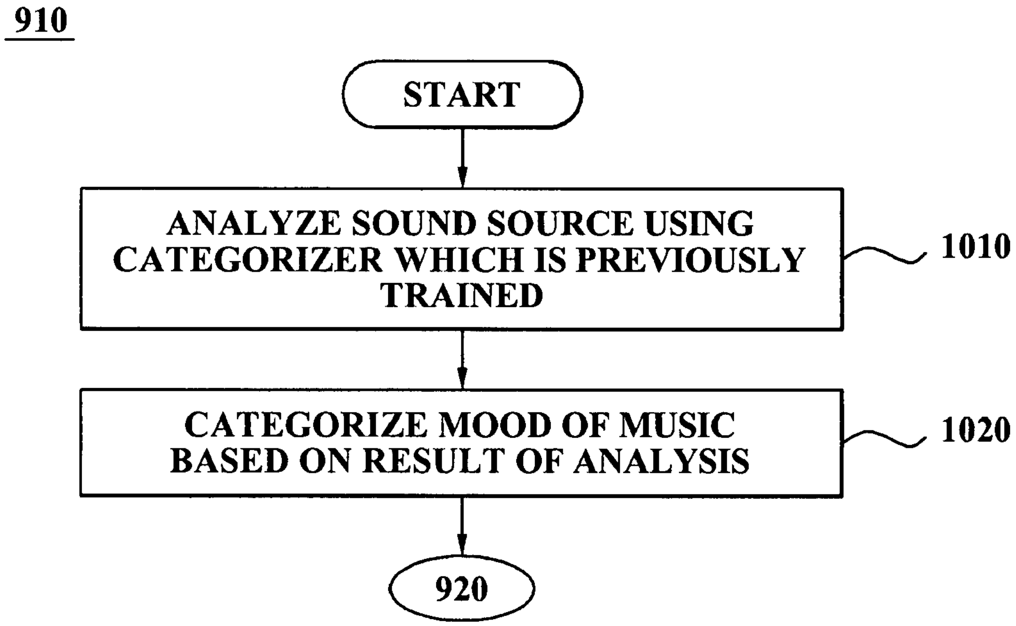
FIG. 10 is a flowchart illustrating a categorization of the mood of the music operation of FIG. 9.

FIG. 10 is a flowchart illustrating the categorization of the mood of the music in operation 910 of FIG. 9.

Referring to FIG. 10, the photo recommendation system 100 of FIG. 1 analyzes a sound source of the music using a categorizer which is previously trained in operation 1010. In this case, the photo recommendation system 100 stores the sound source of the music and meta information of the music using a memory or a storage module. The meta information of the music may include information of a music title, lyrics, a singer, and a genre, and categorization of a mood of the music, which is previously categorized off-line. The photo recommendation system 100 extracts a timbre feature of the sound source of the music, and analyzes the extracted timbre feature.

The photo recommendation system 100 of FIG. 1 categorizes the music into the mood as a result of the analysis of the sound source in operation 1020. Namely, the photo recommendation system 100 categorizes the music into the mood using a categorizer which is previously trained the extracted timbre feature, based on the analyzed timbre feature in operation 1020.

The photo recommendation system 100 of FIG. 1 searches for a photo using the meta information of the music in operation 920. Hereinafter, the searching for the photo will be described in detail by referring to FIG. 11.

Figure 11:
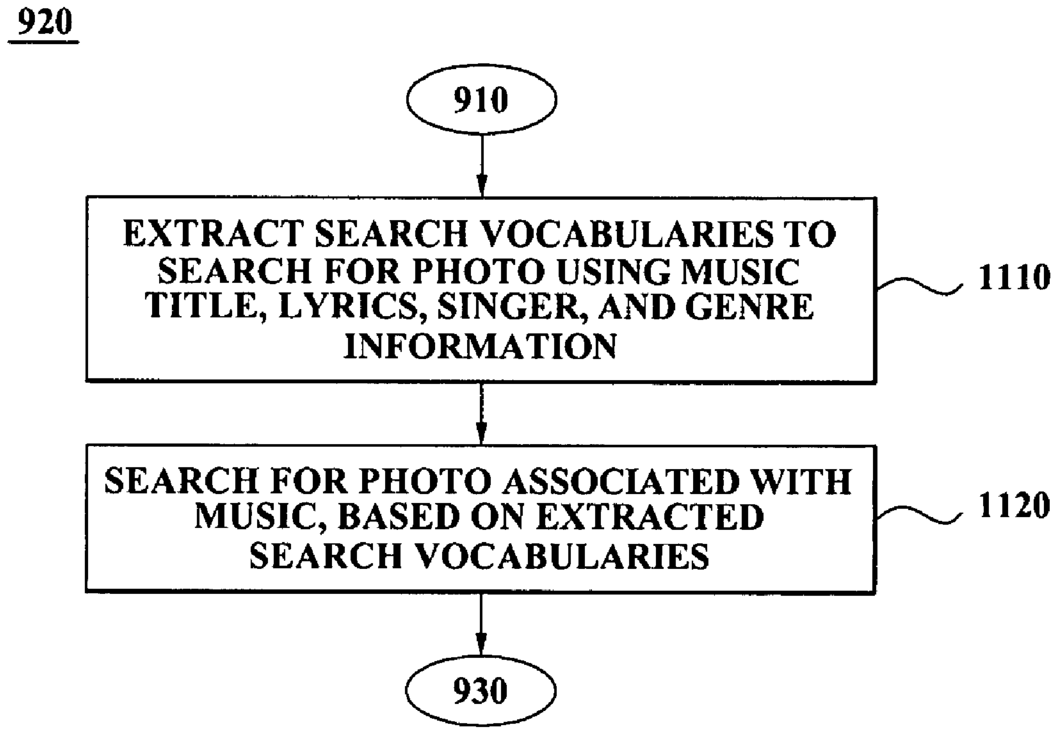
FIG. 11 is a flowchart illustrating a searching of a photo of FIG. 9.

FIG. 11 is a flowchart illustrating the searching for the photo of FIG. 9.

Referring to FIG. 11, the photo recommendation system 100 of FIG. 1 extracts a search vocabulary to search for the photo using a music title, lyrics, a singer, and a genre, included in meta information of the music in operation 1110. Hereinafter, the extracting of the search vocabulary will be described in detail by referring to FIG. 12.

Figure 12:
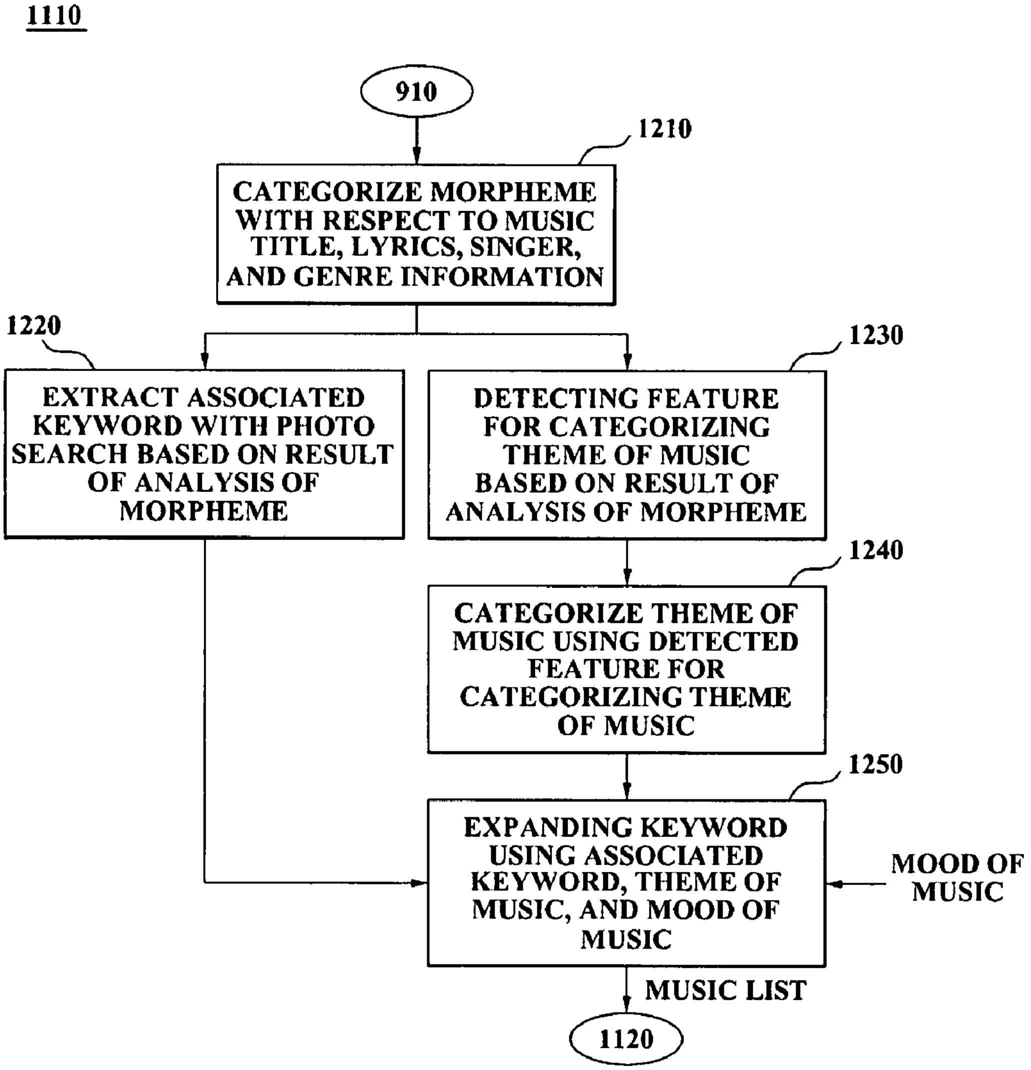
FIG. 12 is a flowchart illustrating an extracting of a search vocabulary of FIG. 11.

FIG. 12 is a flowchart illustrating the extracting of the search vocabulary of FIG. 11.

Referring to FIG. 12, the photo recommendation system 100 of FIG. 1 analyzes a morpheme with respect to a music title, lyrics, a singer, and a genre, included in meta information of the music in operation 1210. Namely, the photo recommendation system 100 analyzes the morpheme, forming the music title, the lyrics, the singer, and the genre, and outputs tag information associated with a result of the analysis of the morpheme in operation 1210. As an example, the morpheme analyzer 410 of FIG. 4 may output the tag information associated with the result of the analysis of the morpheme with respect to the music title, the lyrics, the singer, and the genre as 'Blue/PAA'+'night/NCD'+'Seoul/NQ'+'in/JCA' when the music title is 'Blue Night in Seoul'.

The photo recommendation system 100 of FIG. 1 extracts a keyword associated with a photo using the result of the analysis of the morpheme. Namely, the photo recommendation system 100 extracts the keyword having a close association with searching for the photo using the result of the analysis of the morpheme with respect to the music title, the lyrics, the singer, and the genre in operation 1220. As an example, the photo recommendation system 100 may extract the keyword associated with a 'where/location', 'what/object', 'who/people', 'when/time', 'what/event', and 'which/action' which follows a 6Ws principle, based on the result of the analysis of the morpheme with respect to the music title, the lyrics, the singer, and the genre in operation 1220. Also, the photo recommendation system 100 may extract the keyword associated with the searching for the photo using an ontology with respect to the result of the analysis of the morpheme, based on the 6W's principle and a hierarchy relation in operation 1220.

The photo recommendation system 100 of FIG. 1 detects a feature for categorizing the music into a theme based on the result of the analysis of the morpheme in operation 1230. Namely, the photo recommendation system 100 detects the feature for categorizing the music into the theme using the result of the analysis of the morpheme with respect to the music title, the lyrics, the singer, and the genre. The feature for categorizing the music into the theme is a feature that is necessary for categorizing the music into the theme, and a feature for categorizing the music into the theme according to lyrics may be previously determined by training.

The photo recommendation system 100 of FIG. 1 categorizes the music into the theme based on the detected feature for the categorizing the theme of the music in operation 1240. Namely, the photo recommendation system 100 categorizes the music into the theme using a categorizer which is previously trained based on the detected feature for categorizing the music into the theme in operation 1240. As an example, the photo recommendation system 100 may variously categorize the music into the theme such as 'love', 'breakup', 'spring', 'summer', 'fall', and 'winter'. The theme of the music may be categorized based on the result of the analysis of the morpheme with respect to the music title, the lyrics, the singer, and the genre.

In operation 1250, the photo recommendation system 100 of FIG. 1 expands a photo keyword based on an associated keyword, the theme of the music, and the mood of the music. Namely, the photo recommendation system 100 expands the photo keyword using the associated keyword with respect to the keyword, the theme of the music, and the mood of the music in preparation for a case where few photos are retrieved, or the case a non-photo is retrieved when the photo is retrieved using only a basic keyword.

As an example, in operation 1250, when a basic keyword is 'love', the photo recommendation system 100 of FIG. 1 initially searches for a photo using 'love' for the basic keyword, subsequently expands the basic keyword 'love' to an associated keyword with the basic keyword, the theme of the music, and the mood of the music, such as 'lover', 'date', 'first love', 'one-sided love', 'family', 'song', and 'propose', in preparation for the case a non-photo corresponds to a result of the searching.

As another example, in operation 1250, when a basic keyword is 'breakup', the photo recommendation system 100 of FIG. 1 initially searches for a photo using the 'breakup' for the basic keyword, and may expand the basic keyword 'breakup' to an associated keyword with respect to the basic keyword, the theme of the music, and the mood of the music, such as 'tears', 'broken-heart', 'rain', and 'last date', in preparation for their case a non-photo corresponds to a result of the searching.

As still another example, in operation 1250, when a basic keyword is 'pleasant', the photo recommendation system 100 of FIG. 1 initially searches for a photo using 'pleasant' for the basic keyword, subsequently expands the basic keyword 'pleasant' to an associated keyword with the basic keyword, the theme of the music, and the mood of the music, such as 'pleased', 'joy', 'hilarious', and 'exciting', in preparation for the case a non-photo corresponds to a result of the searching.

The photo recommendation system 100 of FIG. 1 searches for a photo associated with the music based on the extracted search vocabulary in operation 1120. As an example, when an extracted search vocabulary is 'summer', the photo recommendation system 100 searches for a photo associated with the extracted search vocabulary 'summer'. As another example, when an extracted search vocabulary is 'breakup', the photo recommendation system 100 searches for a photo associated with the extracted search vocabulary 'breakup' in operation 1120.

The photo recommendation system 100 of FIG. 1 recommends a photo corresponding to the categorized mood of the music as a result of the searching in operation 930. As an example, when the mood of the music is 'exciting' as the result of the searching, a main color corresponding to a mood 'exciting' is red as illustrated in FIG. 8, in this case, the photo recommendation system 100 may recommend photos in all categories. The photos in all categories may include all recommendable photos in all categories.

As another example, when the mood of the music is 'pleasant' as the result of the searching, a main color corresponding to a mood 'pleasant' of the music is yellow as illustrated in FIG. 8, and the photo recommendation system 100 of FIG. 1 may recommend photos of all categories.

As still another example, when the mood of the music is 'calm' as the result of the searching, a main color corresponding to a mood 'calm' is blue as illustrated in FIG. 8, and the photo recommendation system 100 of FIG. 1 may recommend photos in 'terrain', 'architecture', and 'macro' categories.

As yet another example, when the mood of the music is 'sad' as the result of the searching, a main color corresponding to a mood 'sad' is green as illustrated in FIG. 8, and the photo recommendation system 100 of FIG. 1 may recommend photos of 'terrain', 'architecture', and 'macro' categories.

Figure 13:
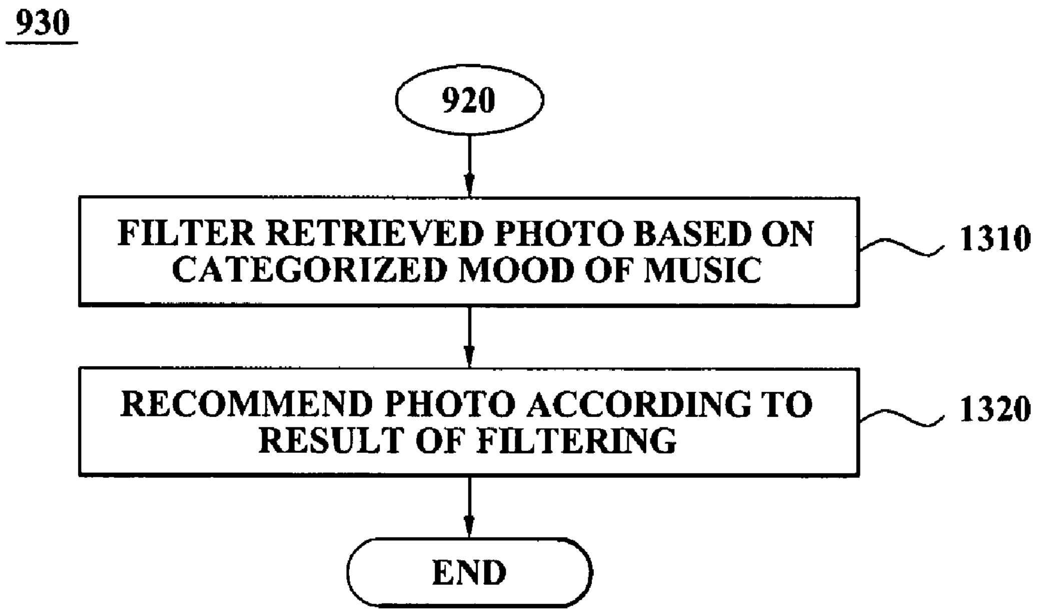
FIG. 13 is a flowchart illustrating a recommendation of a photo of FIG. 9.

FIG. 13 is a flowchart illustrating the recommending of the photo of FIG. 9.

Referring to FIG. 13, the photo recommendation system 100 of FIG. 1 filters the retrieved photo based on the categorized mood of the music in operation 1310. The photo recommendation system 100 filters the retrieved photo by referring to the mood of the music, the color of the photo, and the category of the photos.

As an example, when the mood of the music is 'calm' as illustrated in FIG. 8, the photo recommendation module 130 of FIG. 1 may select a photo in a category whose main color is similar to blue, and may select a photo different from a category of a person.

As another example, when the mood of the music is similar to 'exciting', the photo recommendation system 100 of FIG. 1 may select a photo whose colors are various and bright in operation 1310.

As still another example, when the mood of the music is similar to 'calm', the photo recommendation system 100 of FIG. 1 may select a photo whose colors are monotonous and gloomy from the retrieved photo in operation 1310.

The photo recommendation system 100 of FIG. 1 recommends the photo as a result of the filtering of the photo in operation 1320. Hereinafter, the recommendation of the photo in operation 1320 will be described in detail by referring to FIG. 14.

Figure 14:
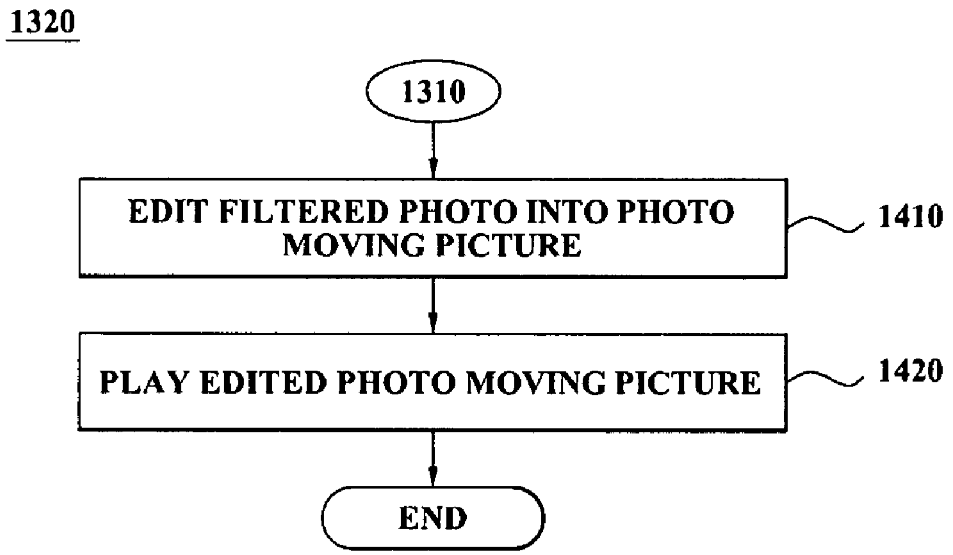
FIG. 14 is a flowchart illustrating another recommendation of the photo of FIG. 13.

FIG. 14 is a flowchart illustrating another embodiment of the recommendation of the photo of FIG. 13.

Referring to FIG. 14, the photo recommendation system 100 of FIG. 1 edits the filtered photo into a moving picture in operation 1410. As an example, the photo recommendation system 100 edits the filtered photo by applying various image conversions effects such as cross fade, checkerboard, circle, wipe, and slide, and generates the moving picture by the editing of the filtered photo. In this case, the photo recommendation system 100 initially displays photos whose keyword are matched by being limited to cases where lyrics are provided, subsequently, with respect to the remaining part, the photo recommendation system 100 displays photos whose color are matched. Also, the photo recommendation system displays the photos whose colors are matched by considering a beat boundary and a mood, and a genre of the music. As an example, when there is a plurality of photos whose colors are matched, the photo recommendation system 100 may edit the plurality of the photos into a slide show type moving picture.

The photo recommendation system 100 of FIG. 1 plays the edited moving picture in operation 1420. As an example, (when the edited moving picture is the slide show type moving picture, the photo recommendation system 100 plays the moving picture slower when the genre of the music is a Rhythm & Blues and a mood of the music is 'calm', and the photo recommendation system 100 plays the moving picture faster when a mood of the music is 'exciting'.

Figure 15:
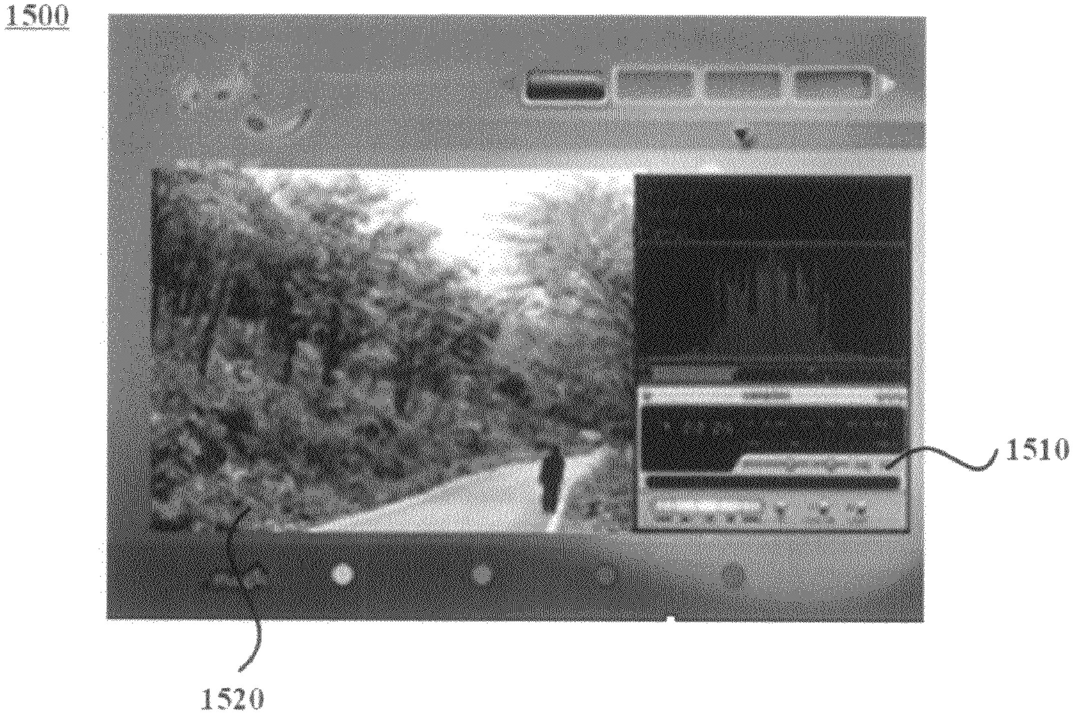
FIG. 15 is a diagram illustrating an example of recommendation of the photo according to a mood of the music.

FIG. 15 is a diagram illustrating an example of the recommendation of the photo according to a mood of music.

Referring to FIG. 15, a screen capture 1500 shows a photo recommendation display using a mood of music, a first portion 1510 shows a music player checking a playing state of the music, and controls to play the music, and a second portion 1520 shows a photo playing display playing recommended photos in correspondence to the mood of the music using music title and lyrics information.

The photo recommendation method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, a photo recommendation method using a mood of music according to the present invention may recommend a photo using information of a mood of music and photo categorization after searching for an associated photo with music title and lyrics information.

Also, a photo recommendation method using a mood of music according to the present invention may more variously use a function of a multimedia device by automatically recommending an appropriate photo for the music from photos that are taken using the multimedia device.

Also, a photo recommendation method using a mood of music according to the present invention may improve utility of stored photos having been taken by automatically recommending an appropriate photo for the music from the stored photos having been taken using the multimedia device.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A photo recommendation method using a mood of music, the method comprising:

categorizing, by a processor, the music into a mood by analyzing a sound source of the music;

searching for a photo using meta information of the music; and recommending the photo corresponding to the categorized mood of the music according to a result of the searching, wherein the recommending of the photo comprises filtering the retrieved photo based on the mood of the music, a color of the photo, and a category of the photo; and recommending a photo according to a result of the filtering, wherein the searching for the photo comprises:

extracting a search vocabulary to search for the photo using information of music title, lyrics, singer, and genre, included in the meta information of the music; and searching for the photo associated with the music, based on the extracted search vocabulary, and wherein the detecting of the search vocabulary comprises:

analyzing a morpheme with respect to the information of the music title, the lyrics, the singer, and the genre;

detecting a keyword associated with the searching for the photo based on a result of the analysis of the morpheme;

detecting a feature for categorizing the music into a theme based on a result of the analysis of the morpheme;

categorizing the music into the theme using the detected feature for categorizing the music into the theme; and expanding a keyword using an associated keyword with the theme of the music and the mood of the music.

2. The method of claim 1, wherein the categorizing of the music into the mood comprises:

analyzing the sound source of the music using a previously trained categorizer; and categorizing the music into the mood according to a result of the analysis.

3. The method of claim 1, wherein the detecting of the keyword detects the keyword associated with a location, an object, a person, a time, an event, and a motion, based on the result of the analysis of the morpheme.

4. The method of claim 1, wherein the detecting of the keyword detects the keyword associated with the searching for the photo using an ontology with respect to the result of the analysis of the morpheme, based on a six W's principle and a hierarchy relation.

5. The method of claim 1, wherein the detecting of the feature detects the feature for categorizing the music into the theme based on the result of the analysis of the morpheme.

6. The method of claim 1, further comprising:

recommending the photo as a result of the filtering;

editing the filtered photo into a moving picture; and playing the edited moving picture.

7. A non-transitory computer-readable storage medium storing a program for implementing a photo recommendation method, the method comprising:

categorizing music into a mood by analyzing a sound source of the music;

searching for a photo using meta information of the music; and recommending a photo corresponding to the categorized mood of the music according to a result of the searching, wherein the recommending of the photo comprises filtering the retrieved photo based on the mood of the music, a color of the photo, and a category of the photo; and recommending a photo according to a result of the filtering, wherein the searching for the photo comprises:

extracting a search vocabulary to search for the photo using information of music title, lyrics, singer, and genre, included in the meta information of the music; and searching for the photo associated with the music, based on the extracted search vocabulary, and wherein the detecting of the search vocabulary comprises:

analyzing a morpheme with respect to the information of the music title, the lyrics, the singer, and the genre;

detecting a keyword associated with the searching for the photo based on a result of the analysis of the morpheme;

detecting a feature for categorizing the music into a theme based on a result of the analysis of the morpheme;

categorizing the music into the theme using the detected feature for categorizing the music into the theme; and expanding a keyword using an associated keyword with the theme of the music and the mood of the music.

8. A multimedia device, including a computer, recommending a photo using a mood of music, the device comprising:

a music mood categorizer, using at least one processing device, categorizing the music into a mood using the computer;

a photo search module searching for a photo using meta information of the music using the computer; and a photo recommendation module recommending the photo corresponding to the categorized mood of the music according to a result of the searching using the computer, wherein the photo recommendation module comprises a photo categorizer categorizing the photo into a category;

a color analyzer analyzing a color of the photo; and a photo filter filtering the retrieved photo based on the mood of the music, the color of the photo, and the category of the photo, wherein the photo search module comprises:

a search vocabulary extraction detection module detecting a search vocabulary to search for the photo using information of music title, lyrics, singer, and genre, included in the meta information of the music; and a search module searching for the photo associated with the music, using the detected search vocabulary, and wherein the search vocabulary extraction module comprises:

a morpheme analyzer analyzing a morpheme with respect to the information of the music title, the lyrics, the singer, and the genre, included in the meta information of the music;

a first detector detecting a keyword based on a result of the morpheme analysis;

a second detector detecting a feature for categorizing the music into a theme based on a result of the analysis of the morpheme;

a theme categorizer categorizing the music into the theme according to the detected feature for categorizing the music into the theme; and a keyword expansion module expanding a photo keyword using an associated keyword with the theme of the music and the mood of the music.

9. The multimedia device of claim 8, wherein the music mood categorizer comprises:

a music storage module storing a sound source of the music and the meta information of the music;

a sound source analyzer analyzing the sound source of the music; and a mood categorizer categorizing the music into the mood according to a result of the analysis.

10. The multimedia device of claim 8, wherein the first detector detects the keyword associated with a location, an object, a person, a time, an event, and a motion, based on the result of the analysis of the morpheme.

11. The multimedia device of claim 8, wherein the theme categorizer categorizes the music into the theme using a previously trained categorizer, based on the detected feature for categorizing the music into the theme.

12. The multimedia device of claim 8, wherein the recommendation module comprises:

a photo editor editing the recommended photo into a photo moving picture; and a photo player module playing the edited moving picture.

13. The multimedia device of claim 12, wherein the photo editor edits the plurality of recommended photos into the photo moving picture in a form of a slide show.

* * * * *